No. 750,500. PATENTED JAN. 26, 1904.
E. A. SPERRY.
SYSTEM OF ELECTRICAL GENERATION, DISTRIBUTION, AND CONTROL.
APPLICATION FILED JULY 1, 1903.
NO MODEL.
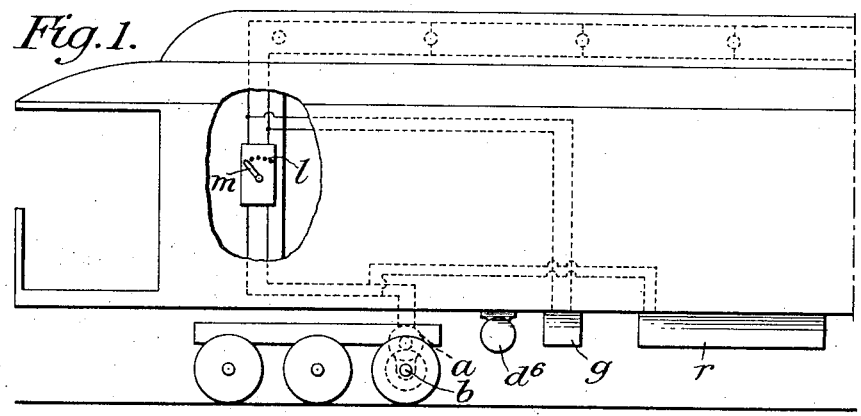
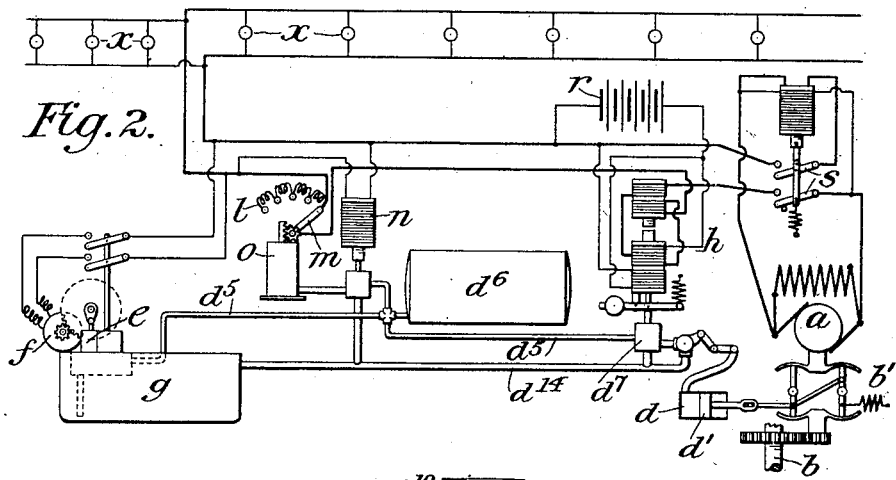
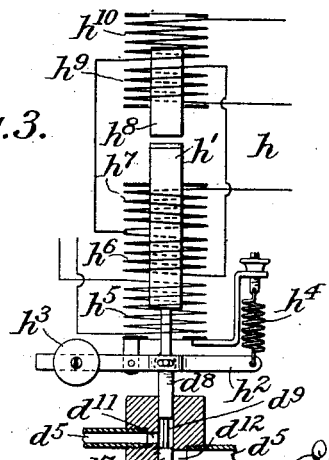

No. 750,500.

Patented January 26, 1904.

UNITED STATES PATENT OFFICE.

ELMER A. SPERRY, OF CLEVELAND, OHIO, ASSIGNOR TO NATIONAL BATTERY COMPANY, OF JERSEY CITY, NEW JERSEY, AND BUFFALO, NEW YORK, A CORPORATION OF NEW JERSEY.

SYSTEM OF ELECTRICAL GENERATION, DISTRIBUTION, AND CONTROL.

SPECIFICATION forming part of Letters Patent No. 750,500, dated January 26, 1904.

Application filed July 1, 1903. Serial No. 163,838. (No model.)

*To all whom it may concern:*

Be it known that I, ELMER A. SPERRY, a citizen of the United States, residing in Cleveland, county of Cuyahoga, State of Ohio, have invented certain new and useful Improvements in Systems of Electrical Generation, Distribution, and Control, of which the following is a specification, reference being had to the accompanying drawings, forming a part hereof.

This invention relates to systems and apparatus for the generation, distribution, and control of electric current, such as are described in my prior application, Serial No. 134,035, filed December 5, 1902, and in the application of Lamar Lyndon and myself, Serial No. 139,399, filed January 17, 1903, and more especially to the control of the electromotive force of the generator and the storage battery. In the application of Lamar Lyndon, Serial No. 140,074, filed January 22, 1903, there are described provisions whereby the voltage of the storage battery can be increased substantially to the predetermined limit of about 2.5 volts while the battery is being charged, the delivery of charging current to the battery being discontinued as soon as the battery is fully charged. Such provisions are effective for their intended purpose; but for the practical operation of the system under all of the conditions which may be met it is desirable to add to the devices described and shown in said application, Serial No. 140,074, particularly to provide for a proper division of the generator-current between the storage battery and the circuit of the translating devices, as without such provision an excessive amount of current might flow from the generator if the normal current were flowing to the battery and the circuit of the translating devices were closed at the same time, thus resulting in the burning out of the generator. It is also desirable to make further provision whereby the speed, and therefore the electromotive force, of the generator shall be further reduced when the battery is fully charged and when there is no demand or little demand for current through the translating devices, as in the day-time, if the invention is applied to a car-lighting system. The provisions whereby these several results are accomplished will be more fully described and explained hereinafter with reference to the accompanying drawings, in which the invention is illustrated and in which, as far as possible, the same reference characters are employed to designate like parts as in the several applications referred to.

In the drawings, Figure 1 is a view in side elevation, partly broken out, of a railway-car to which the invention is applied. Fig. 2 is a diagrammatic view illustrating the general relation of the several mechanical and electrical elements of the system. Fig. 3 is a detail view, partly diagrammatic and partly in vertical section, illustrating the electromagnetic device and the valve operated thereby for controlling the speed of the generator.

Reference may be had to the several applications above referred to in explanation in detail of various features of the system and apparatus. So far as the same are particularly involved in the particular operation of the present invention they will be briefly referred to hereinafter.

The generator $a$ may be of any suitable construction and may be arranged to be driven from a variable-speed power source, such as a car-axle $b$, through a transmitting mechanism, such as is indicated at $b'$, which permits the speed, and therefore the electromotive force, of the generator to be regulated as the conditions of the system may require, such a transmitting mechanism being shown and described in detail in another application by myself, Serial No. 146,281, filed March 5, 1903, to which reference may be had. It is sufficient for the present purposes to state that the transmitting mechanism may be operated by fluid-pressure acting through a cylinder $d$. A suitable system of pipes $d^5$ and $d^{14}$, with a pressure-reservoir $d^6$ in connection therewith, is provided for the delivery of the fluid under pressure to the cylinder $d$ and the return of the fluid to its source of supply, which may be a pump $e$, driven by a motor $f$ in circuit with the generator or with the storage battery, hereinafter referred to. An electromagnetic device (represented at $h$ in Fig. 2 and shown in detail in Fig. 3) is provided for the control of the pressure in the cylinder $d$, and therefore for the control through the medium of the variable-speed power-transmitting device $b'$ or other device of suitable character of the speed, and therefore of the electromotive force of the generator. This electromagnetic device, which is properly in the form of a solenoid has its several windings in circuit, as hereinafter described. The core $h'$ is statically balanced, being connected by a lever $h^2$ with a counterweight $h^3$ and with an adjustable spring $h^4$, which opposes the pull of the solenoid upon the core. The core of the solenoid controls a valve $d^7$, interposed in the pipe system, by means of which the admission of oil to the cylinder $d$ is regulated and by which the oil in the cylinder may be in part released and permitted to return to the oil-pan $g$. As shown, the valve comprises a plug or stem $d^8$, turned down, as at $d^9$, to form a passage between the head $d^{10}$ and the body of the valve. The valve-chamber has a port $d^{11}$ communicating with the pressure-tank, a port $d^{12}$ communicating with the cylinder $d$, and a port $d^{13}$ communicating with the oil-pan $g$ through a return-pipe $d^{14}$. The valve is shown in its normal position, the port $d^{12}$ being closed. In the arrangement shown in the drawings the core will be pulled downward by an increase of the magnetic pull of the solenoid against the tension of the spring $h^4$, so that the head $d^{10}$ of the valve will be moved to establish communication between the port $d^{11}$ and the port $d^{12}$, thereby permitting more oil to pass into the cylinder $d$, which acts upon the transmitting device $b'$ to reduce the speed of the generator. If the magnetic pull of the solenoid decreases, the spring $h^4$ will lift the core, thereby moving the valve-plug to establish communication through the channel $d^9$ between the port $d^{12}$ and the port $d^{13}$, and so relieving the pressure behind the piston $d'$ in the cylinder $d$ and permitting the transmission mechanism to shift in the proper direction to increase the speed of the generator.

The winding $h^5$ of the solenoid $h$ is included in a shunt across the storage battery $r$, which is arranged to supply current to the lamps or other translating devices when the generator is stopped and to be charged by the generator when the lamps or other translating devices are not in use. A second coil, $h^6$, of the solenoid is in series with the lamps or other translating devices, and a third coil, $h^7$, is in series with the battery $r$. In the arrangement shown the winding of the coil $h^5$ is the same as that of the coil $h^6$, while the coil $h^7$ is wound in the opposite direction. The connection from the generator $a$ is made at a common point of the two coils $h^6$ and $h^7$, so that both of these coils are in series with the generator. The effect of the two coils is therefore cumulative with the effect of the shunt-coil $h^5$ when the current flows from the generator; but when current flows from the battery, as when the lights are first turned on, one coil, $h^6$, neutralizes the other, $h^7$, leaving the shunt-coil $h^5$ to exert its effect alone upon the core of the solenoid. When the normal generator-current is flowing, the solenoid-core is in its normal position, substantially as represented in Fig. 3, and this condition will exist when the electromotive force of the battery is substantially 2.5 volts per cell and when the lamp-circuit is open, so that no current is flowing either to the battery through the coil $h^6$ or to the lamp-circuit through the coil $h^5$. If less than the normal generator-current is flowing or if the action of the solenoid is in any other manner decreased, the spring $h^4$, connected to the lever $h^2$, overcomes the pull of the solenoid, so that the valve $d^7$ is operated to relieve the pressure in the cylinder $d$, and thereby through its action on the transmitting mechanism $b'$ the speed of the generator is increased. In like manner if more than the normal generator-current is flowing or the pull of the solenoid is in any other manner increased the valve $d^7$ is operated to cause a decrease in the speed of the generator. The tendency of the coils $h^6$ and $h^7$ when current flows through them from the generator is to increase the pull of the solenoid, supplementing the action of the coil $h^5$, and thus bringing about a reduction in the speed of the generator; but whether such result takes place or not will depend, of course, upon the current which flows through the several coils. The tendency of the combined effect of the shunt-coil $h^5$ and the battery-coil $h^7$ will be to draw the core $h'$ into the solenoid and reduce the speed of the generator, while if the circuit of the lamps or other translating devices is closed the current from the generator will divide itself between the battery and the lamps, and the tendency of the combined effect of the three coils will also be to draw the core into the solenoid and decrease the speed of the generator. It will be understood that as between the coil $h^7$ and the coil $h^5$ the assisting effect of the coil $h^7$ will be an inverse function of the voltage at the terminals of the battery, so that as the voltage of the battery approaches its limit of 2.5 volts the aggregate effect of the coil $h^5$ and the coil $h^7$ will more slowly approach the point at which the core of the solenoid will be moved in opposition to its spring, and the movement of the core will be delayed until the voltage of the battery has reached 2.5 volts per cell. So long as the output of current by the generator is not too great, therefore, no movement of the core will take place, and the speed of the generator will remain unchanged so long as the battery voltage remains unchanged. Any increase of the speed of the generator through an increase in the speed of the car will of course cause an increase of current, a corresponding movement of the solenoid core, and an immediate regulation of the transmitting mechanism $b'$, which will at once reduce the speed of the generator. The decrease in speed of the generator will continue until its voltage changes to such a point that the proper current will flow through the coils $h^6$ and $h^7$. As soon as the voltage of the battery reaches 2.5 volts and the generator continues to operate at an unnecessary high speed the tendency of more current to pass through the series battery-coil $h^7$ will immediately act to draw farther in the core of the solenoid, and thereby to reduce at once the speed of the generator. In this manner not only is the limit of the battery charge as to voltage fixed, but the delivery of charging-current to the battery is automatically discontinued as soon as the battery is fully charged. If the lamp-circuit is closed when the battery has been fully charged, the flow of current through the lamp series coil $h^6$ will draw in the core $h'$ somewhat and cause the speed of the generator to be decreased slightly until its voltage is reduced to such a point that the battery will tend slightly to discharge itself and the voltage thereof be reduced to 2.3 volts or less. This decrease of the difference between the battery voltage and the lamp voltage will decrease correspondingly the amount of resistance necessary to be interposed between the generator and the lamp-circuit.

It will be seen that the coöperation of the shunt-coil $h^5$ and the series coil $h^7$ of the solenoid permits the delivery of current to the battery to be decreased as the counter electromotive force of the battery is increased, the battery-charging current becoming very small or practically zero when the requisite voltage of 2.5 volts is reached in the battery. The provision of these two coils only, however, does not provide for a division of the generator-current between the battery and the lamps in a proper ratio, but would permit an excessive amount of current to flow from the generator if the normal current were flowing to the battery and the lamps at the same time were turned on, thus resulting in the burning out of the generator. The addition of series coil $h^6$ in the lamp-circuit causes the generator-current to be divided properly and each circuit—that is, the lamp-circuit and the battery-circuit—to receive its proper proportion of the total current normally delivered by the generator.

To meet satisfactorily all of the conditions imposed by the operation of a car-lighting or other analogous system, it is necessary to provide additional means for further reducing the speed of the generator when the battery is fully charged and there is no demand for current for lighting purposes, as during the day-time. The additional device provided for this purpose is also shown in detail in Fig. 3 and comprises a second solenoid-core $h^8$ in line with the solenoid-core $h'$ and above the same, so that the weight of the core $h^8$ may be added under certain conditions to the main solenoid-core $h'$, thus supplementing the attractive force of the shunt-coil $h^5$ of the main solenoid. The second solenoid has two coils, both wound in the same direction, one coil, $h^9$, being in series with the lamp-circuit, while the other coil, $h^{10}$, is in series with the generator. Under normal operating conditions the core $h^8$ is held up by the combined action of both coils $h^9$ and $h^{10}$. In the day-time, when the lamp-circuit is open, no current flows through the coil $h^9$, and the gradually-decreasing current to the battery through the coil $h^{10}$ will eventually permit the core $h^8$ to fall, adding its weight to the core $h'$ of the first solenoid, and thus supplementing the action of the shunt-coil $h^5$, so that the controlling-valve $d^7$ is moved to admit oil to the cylinder $d$ and further reduce the speed of the generator. When the lamp-circuit is closed, current from the battery flows through the coils $h^6$ and $h^7$ of the main solenoid, which neutralize each other, and thence through the coil $h^9$ of the second solenoid, thereby causing the second solenoid to pick up the weight $h^8$ and relieve the core $h'$ of the main solenoid of the abnormal weight of the core $h^8$. When the core $h'$ is thus relieved of the abnormal weight, it is free to be lifted by the spring $h^4$, connected to the lever $h^2$, and the valve $d^7$ is thereby operated to relieve the pressure in the cylinder $d$, and thereby to increase the speed of the generator until normal operating conditions are restored.

It is obvious that any tendency of the two cores $h'$ and $h^8$ to adhere to each other when magnetized may be overcome, if necessary, by magnetically insulating the two cores from each other in any usual manner.

It will be understood that an automatic resistance device, such as the rheostat $l\ m$, operated by oil-pressure in the cylinder $o$ under the control of an electromagnetic device $n$ in circuit with the lamp or other translating devices $x$, is provided for the purpose of maintaining a current of substantially uniform voltage through the translating devices, the same being preferably arranged as shown in the applications above mentioned. The switch $s$ to cut out the generator when it is running at low speed is also preferably employed and arranged substantially as described, particularly in application Serial No: 140,074, to which reference may be had for a detailed description of the operation thereof.

The operation of the device herein particularly sought to be covered has been sufficiently indicated and requires no further explanation herein.

It will be understood that various changes may be made in details of construction and arrangement without departing from the spirit of the invention.

I claim as my invention—

1. The combination of a generator, means to regulate the electromotive force of said generator, translating devices in circuit with the generator, a storage battery in parallel circuit with the generator and an electromagnetic device to control said regulating devices, said electromagnetic device having one winding in a shunt from the battery, a second winding in series with the generator and the translating devices, and a third winding in series with the generator and the battery.

2. The combination of a generator, means to regulate the electromotive force of said generator, translating devices in circuit with the generator, a storage battery in parallel circuit with the generator, an electromagnetic device to control said regulating devices and having a winding in a shunt from the battery, and a second electromagnetic device having a winding in circuit with the generator and the translating devices and coöperating with the first-named electromagnetic device.

3. The combination of a generator, means to regulate the electromotive force of said generator, translating devices in circuit with the generator, a storage battery in parallel circuit with the generator, an electromagnetic device to control said regulating devices and having a winding in a shunt from the battery, and a second electromagnetic device having one winding in series with the translating devices and another in series with the generator and coöperating with the first-named electromagnetic device.

4. The combination of a generator, means to regulate the electromotive force of said generator, translating devices in circuit with the generator, a storage battery in parallel circuit with the generator, an electromagnetic device to control said regulating devices and having one winding in a shunt from the battery and two other windings in series with the generator and with the translating devices and the battery respectively, and a second electromagnetic device coöperating with the first and having one winding in series with the translating devices and another in series with the generator.

5. The combination of a generator, means to regulate the electromotive force of said generator, translating devices in circuit with the generator, a storage battery in parallel circuit with the generator, a solenoid to control said regulating devices having a winding in a shunt from the battery, and a second solenoid having its core in line with and above the core of the first solenoid, said second solenoid having a winding in circuit with the generator and the translating devices.

This specification signed and witnessed this 21st day of April, A. D. 1903.

ELMER A. SPERRY.

In presence of—
ANTHONY N. JESBERA,
JOHN M. SCOBLE.